US012259538B2

(12) United States Patent
Kalkbrenner et al.

(10) Patent No.: US 12,259,538 B2
(45) Date of Patent: Mar. 25, 2025

(54) METHOD FOR OPERATING A SAMPLE CHAMBER FOR MICROSCOPIC IMAGING, APPARATUS, AND SAMPLE CHAMBER

(71) Applicant: CARL ZEISS MICROSCOPY GMBH, Jena (DE)

(72) Inventors: Thomas Kalkbrenner, Jena (DE); Ralf Wolleschensky, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 847 days.

(21) Appl. No.: 17/309,793

(22) PCT Filed: Dec. 2, 2019

(86) PCT No.: PCT/EP2019/083222
§ 371 (c)(1),
(2) Date: Jun. 18, 2021

(87) PCT Pub. No.: WO2020/126419
PCT Pub. Date: Jun. 25, 2020

(65) Prior Publication Data
US 2022/0043244 A1 Feb. 10, 2022

(30) Foreign Application Priority Data
Dec. 19, 2018 (DE) .................... 10 2018 222 271.1

(51) Int. Cl.
*G02B 21/34* (2006.01)
*G02B 21/00* (2006.01)
(Continued)

(52) U.S. Cl.
CPC ....... *G02B 21/0032* (2013.01); *G02B 21/002* (2013.01); *G02B 21/0036* (2013.01);
(Continued)

(58) Field of Classification Search
None
See application file for complete search history.

(56) References Cited

U.S. PATENT DOCUMENTS 9,568,723 B2   2/2017   Van Rooyen et al.
9,791,687 B2   10/2017  Schweinitzer et al.
(Continued)

FOREIGN PATENT DOCUMENTS

DE   102013211426 A1   12/2014
DE   102013107298 A1   1/2015
(Continued)

OTHER PUBLICATIONS

Search Report for German Application No. 102018222271.1, mailed on Apr. 15, 2019, 10 pages.
(Continued)

*Primary Examiner* — Derek S. Chapel
(74) *Attorney, Agent, or Firm* — Brake Hughes Bellermann LLP

(57) ABSTRACT

A sample chamber encloses a sample space for positioning a sample and includes a wall that delimits the sample space and has an outer side facing away from the sample space. An illumination beam path is directed through the outer side into the sample space. Detection radiation is detected along a detection axis extending from the sample chamber through the wall of the sample chamber. The sample chamber has an outer surface with a shape of a spherical section with a circular disc as the base surface. The sample chamber and the detection axis are rotated and/or pivoted relative to one another about the center point of the circular disc so that different angular positions of the sample chamber relative to the detection axis are adjusted and image data is recorded at different angular positions of the sample chamber relative to the detection axis.

9 Claims, 10 Drawing Sheets

(51) Int. Cl.
*G02B 21/06* (2006.01)
*G02B 21/26* (2006.01)
*G02B 21/36* (2006.01)

(52) U.S. Cl.
CPC ......... *G02B 21/0076* (2013.01); *G02B 21/06* (2013.01); *G02B 21/26* (2013.01); *G02B 21/34* (2013.01); *G02B 21/365* (2013.01); *G02B 21/367* (2013.01)

(56) References Cited

U.S. PATENT DOCUMENTS

| | | | |
|---|---|---|---|
| 10,458,899 | B2 | 10/2019 | Knebel et al. |
| 10,620,419 | B2 | 4/2020 | Siebenmorgen et al. |
| 2017/0139195 | A1 | 5/2017 | Kennedy |
| 2017/0292907 | A1* | 10/2017 | Sahlgren ............ G02B 21/36 |
| 2018/0052314 | A1* | 2/2018 | Brinkman ............ G02B 21/22 |
| 2019/0339505 | A1 | 11/2019 | Siebenmorgen et al. |

FOREIGN PATENT DOCUMENTS

| | | |
|---|---|---|
| DE | 102016212019 A1 | 1/2018 |
| JP | 2013545138 A | 12/2013 |
| JP | 2015118378 A | 6/2015 |
| JP | 2017146442 A | 8/2017 |
| WO | 2007065711 A1 | 6/2007 |
| WO | 2018166744 A1 | 9/2018 |
| WO | 2019063782 A2 | 4/2019 |

OTHER PUBLICATIONS

English Translation of International Search Report from PCT/EP2019/083222, Mar. 24, 2020, 2 pages.

English Translation of Office Action for Japanese Patent Application No. 2021-535872, mailed on Jun. 27, 2023, 4 pages.

English Translation of the International Preliminary Report on Patentability for PCT Application No. PCT/EP2019/083222, mailed on Jul. 1, 2021, 9 pages.

* cited by examiner

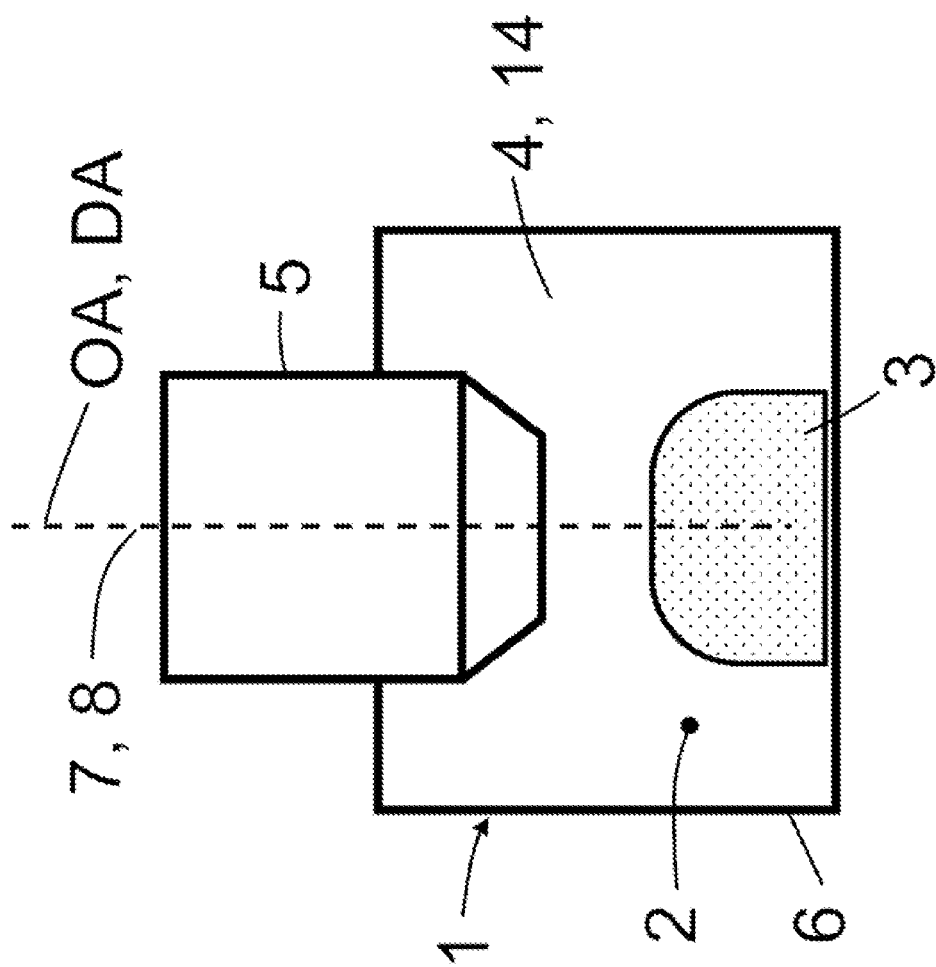

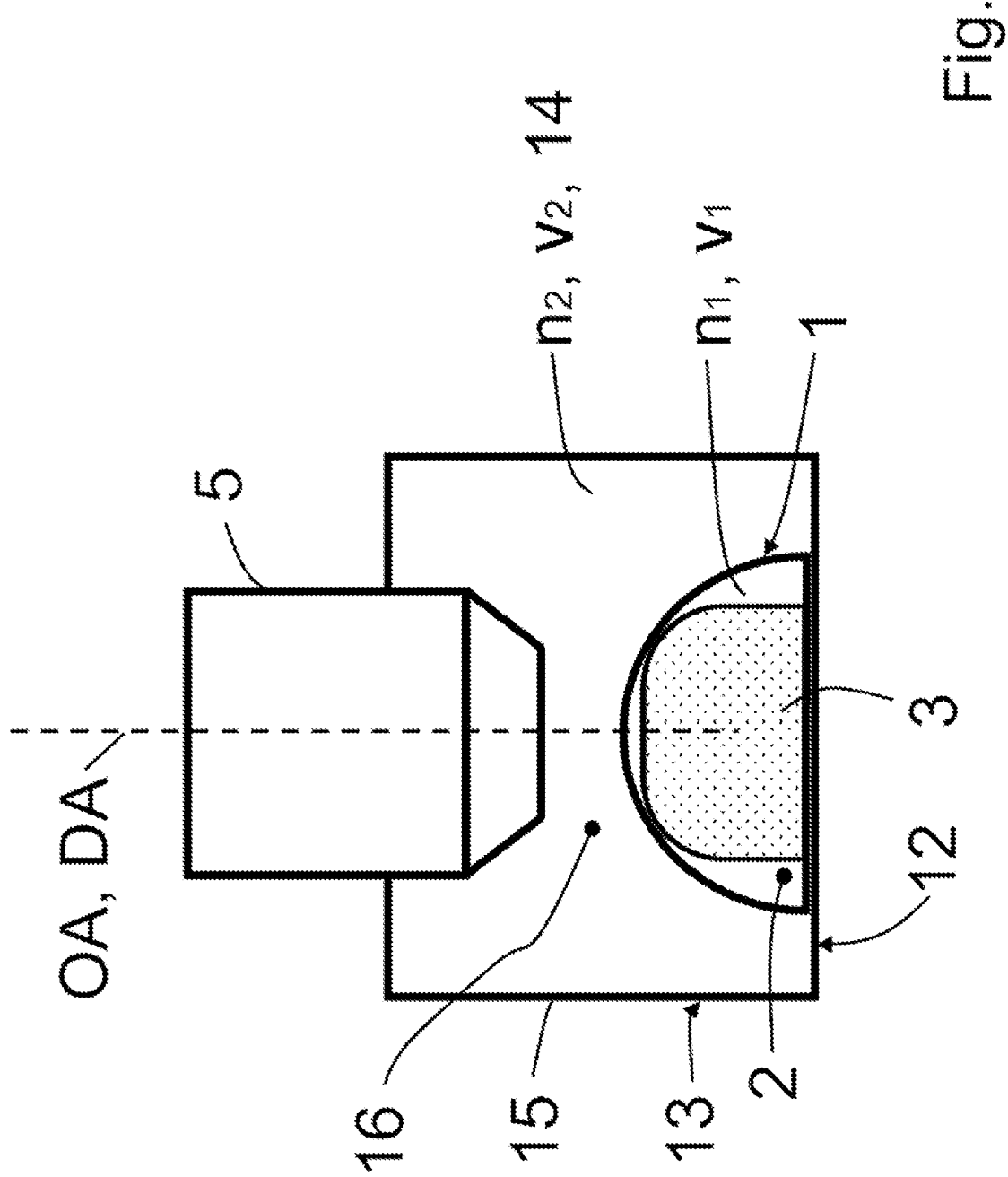

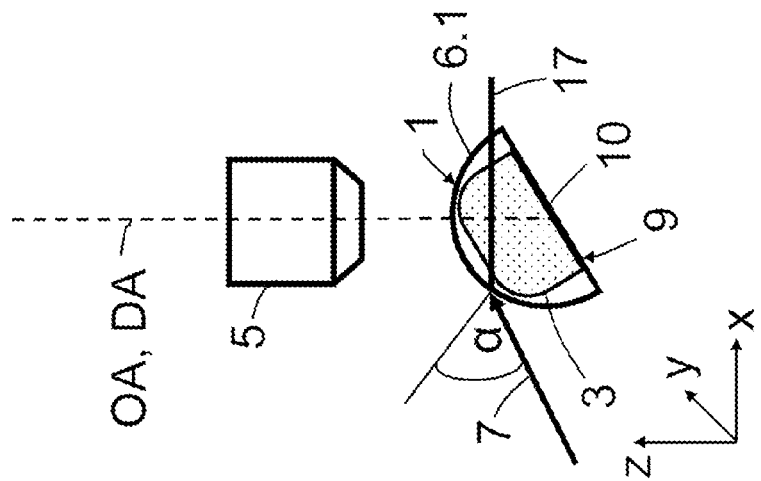
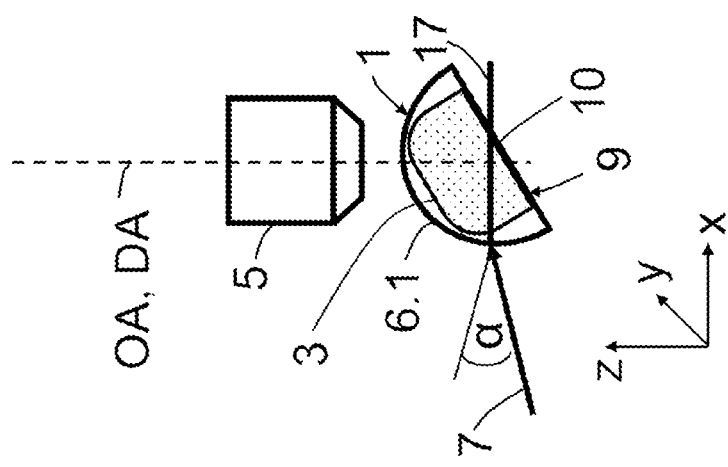
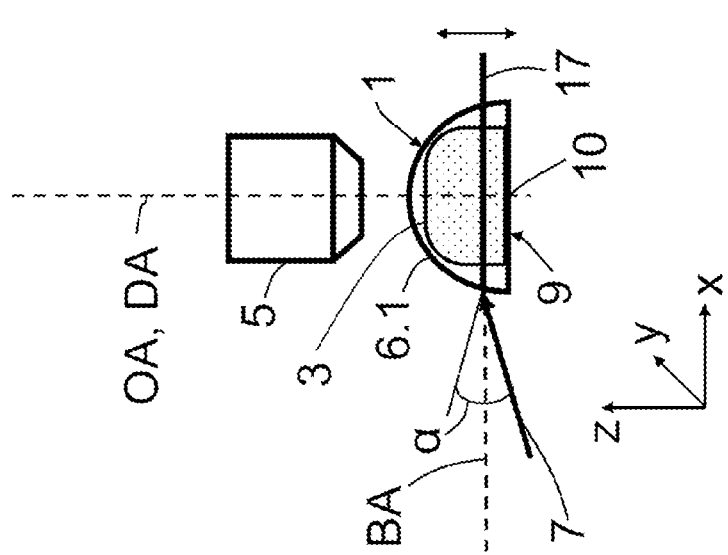

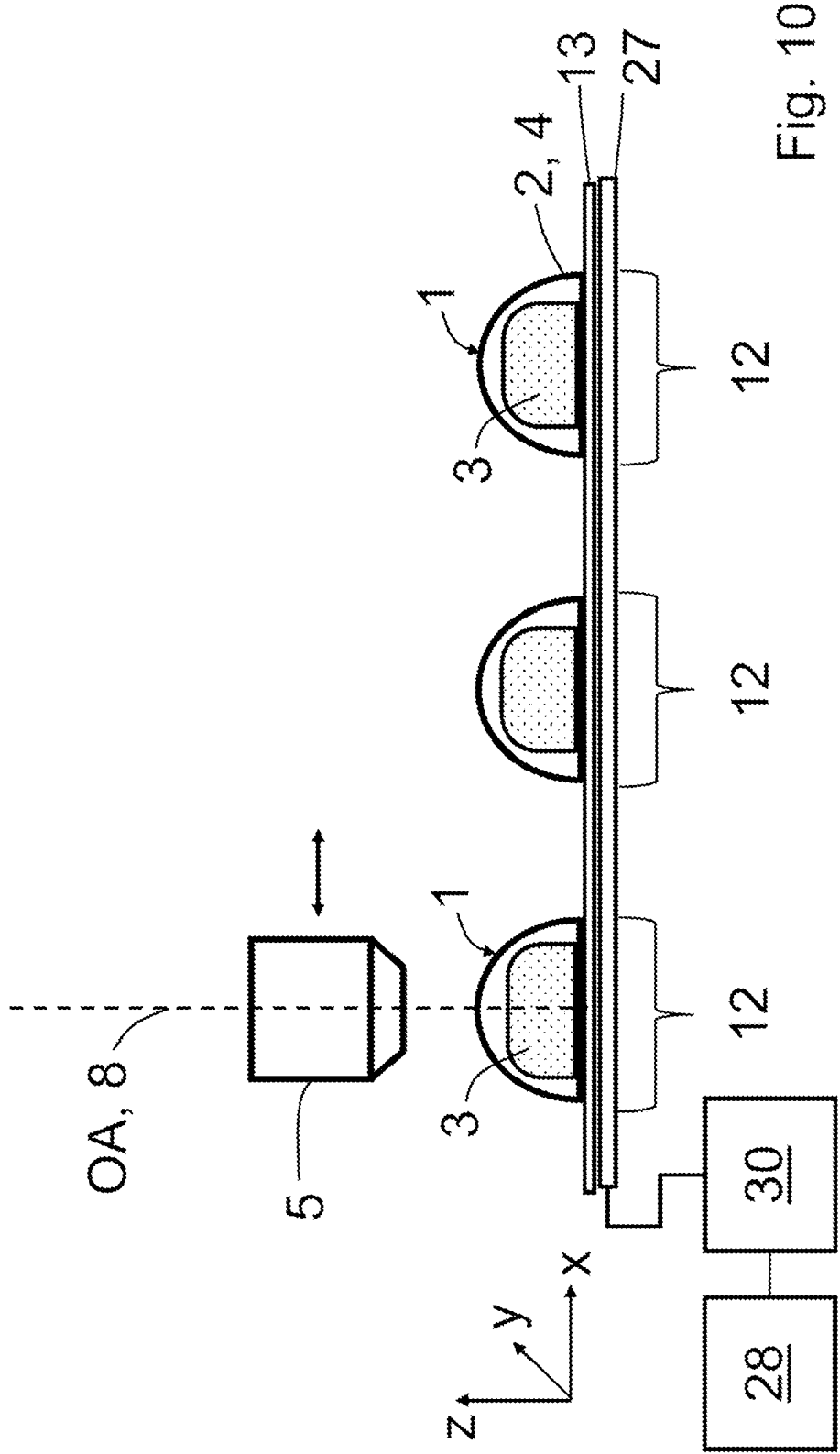

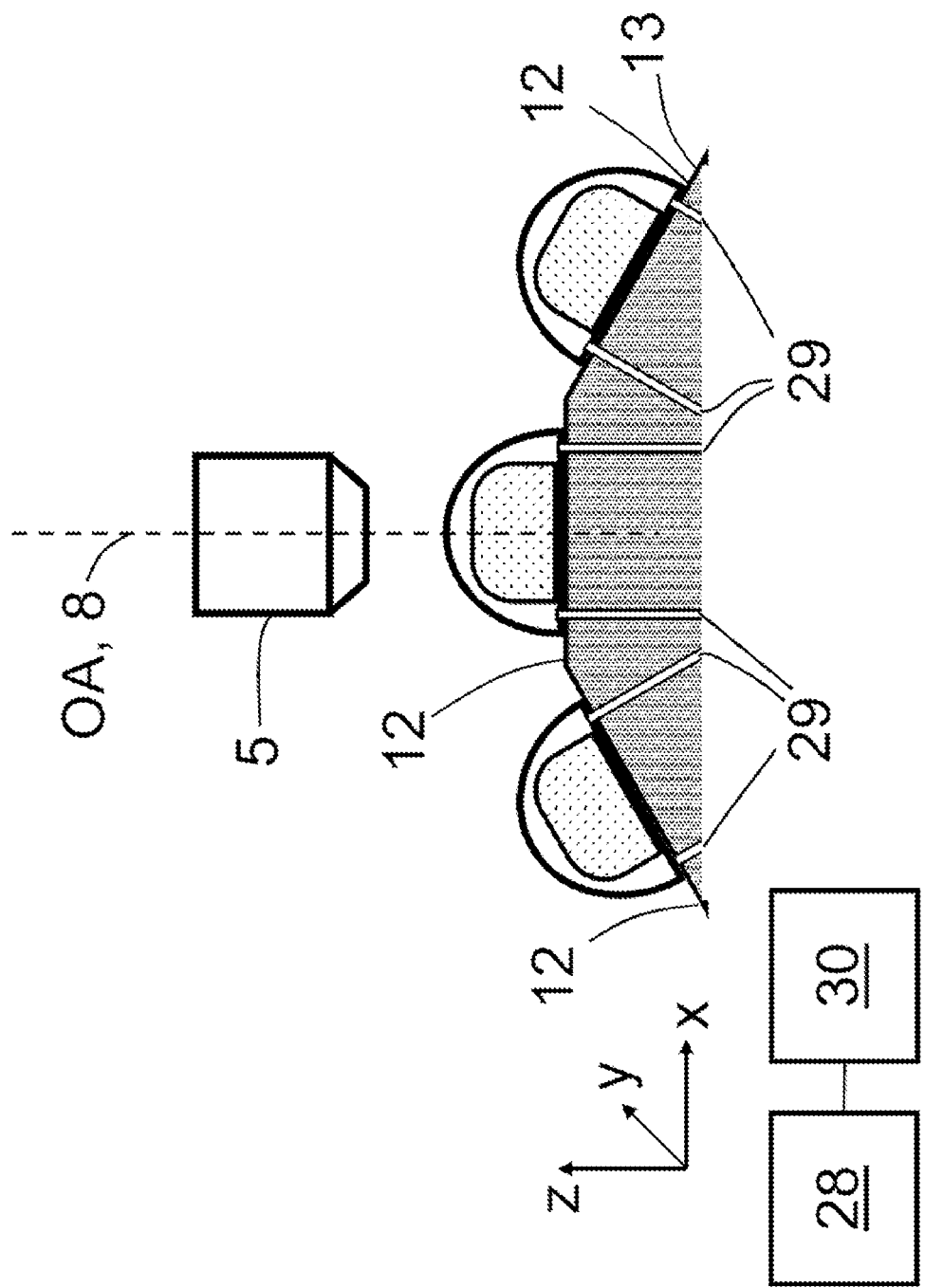

METHOD FOR OPERATING A SAMPLE CHAMBER FOR MICROSCOPIC IMAGING, APPARATUS, AND SAMPLE CHAMBER

CROSS REFERENCE TO RELATED APPLICATIONS

This application is a 35 U.S.C. § 371 National Phase Entry Application from PCT/EP2019/083222, filed Dec. 2, 2019, designating the U.S., and claims the benefit of German Application No. 102018222271.1, filed Dec. 19, 2018. The disclosures of both of the above-referenced applications are incorporated herein by reference in their entireties.

TECHNICAL FIELD

This disclosure relates to methods for operating a sample chamber for microscopic imaging and to an apparatus for carrying out the method. The subject matter further relates to a sample chamber which, in particular, is used in the methods.

BACKGROUND

In order to examine tissue and organs using imaging methods, in particular by means of microscopic methods, ex vivo, these can be treated chemically in such a way that even structures situated deep within the tissue or the organ become visible.

The tissue or organs—hereinafter referred to as sample in general—are subjected to a treatment with certain chemicals to this end, which is also referred to as "clearing". By way of example, lipids present are removed or replaced by the action of the chemicals, with support structures, for example, remaining unchanged. The remaining structures obtained can be made visible and imaged by means of fluorescence markers. The effective penetration depth of microscopy methods can be significantly increased, for example because of reduced scattering of illumination or detection radiation on account of lipids removed in this way. Methods for "clearing" samples, e.g., brains, are known from Silvestri, L. et al. (2016): Clearing of fixed tissue: a review from a microscopist's perspective. Journal of biomedical optics, 21(8): 081205 or Richardson, D. S. & Lichtman, J. W. (2015): Clarifying tissue clearing. Cell, 162(2): 246-257, for example.

Clearing of samples is used for the examination of brains, in particular. In this context, to understand structure and function of the brain and its neural structures, it is important to be able to examine the cleared brains in their entirety where possible. In this context, typical samples are cleared brains of mice. Their dimensions of 8-10 mm require an optical penetration depth of at least approximately 10 mm.

The chemicals used for clearing (clearing media) are partly very aggressive or even toxic, and often expensive. If the conventional immersion arrangements from the prior art are used, this may lead to unwanted imaging aberrations. By way of example, if a clearing medium used for clearing purposes ultimately forms the immersion as sample medium, aberrations may be caused by optical properties of the clearing medium (refractive index, Abbe number) which are unknown or not fully compensated for in the objective. Moreover, the objective comes into contact with the aggressive and/or toxic chemicals, which may lead to the objective being damaged and means increased outlay when ensuring occupational safety and health protection and a reduction in the service life of the optical components.

SUMMARY

The invention is based on the object of proposing an option, both in terms of methods and in terms of apparatus, by means of which the disadvantages occurring in the prior art are reduced.

The object is achieved by a method for operating a sample chamber for microscopic imaging, by a sample chamber, and by an apparatus for capturing image data. The subject matter also relates to a sample carrier for holding at least one sample chamber.

The method for operating a sample chamber for microscopic imaging includes the steps of providing a sample chamber in an illumination beam path and capturing detection radiation. The utilized sample chamber surrounds a sample space, in which a sample can be positioned or is positioned. The sample chamber includes at least one wall that delimits the sample space and has an outer side facing away from the sample space. Moreover, the illumination beam path is directed through the outer side and into the sample space. The section of the illumination beam path directed through the outer side and into the sample space is also referred to and understood as the illumination axis.

Within the step of capturing the detection radiation, detection radiation, which was caused by means of illumination radiation directed into the sample space along the illumination axis, is captured along a detection axis that extends from the sample space through the wall of the sample chamber. The detection axis is part of a detection beam path.

The method is characterized in that use is made of a sample chamber, the outer side of which has the shape of a spherical segment with a circular disk as the base, which is also referred to as spherical shape below. Moreover, the sample chamber and the detection axis are rotated and/or pivoted relative to one another about the center of the circular disk so that different relative angular positions of sample chamber and detection axis are set. Image data are captured at different relative angular positions of sample chamber and detection axis. In this case, the detection axis always extends through the spherical outer side.

The use of a sample chamber with a spherical outer side is described in more detail below. The design of at least one outer side of the sample chamber as a sphere (spherical section), and the movement of the sample chamber about the center of the circular disk, advantageously allow a multiplicity of different relative angular positions to be set. At the same time, an angle of the detection axis relative to the outer side is kept constant. By way of example, the detection axis always coincides with a normal of the outer side, independently of the relative angular position set. This constancy of the orientation of the detection axis is only limited by the actual shape of the sample chamber, in particular by the angular range covered by the outer side and the arc length of the outer side. Other shapes of the base of the sample chamber than a circular disk, for example a polygon or a free form, are equivalent.

The use of the sample chamber advantageously allows an objective used to capture the detection radiation to be separated from the sample medium.

In one configuration of the method, image data are captured for at least two different relative z-positions in a respective relative angular position. In the process, a respective relative Z-position is set by virtue of the sample chamber and/or a focal plane of an imaging optical unit being displaced relative to one another along the detection axis. The direction of the detection axis is referred to as z-direction (z-axis). A relative z-position denotes a position of the focal plane along the detection axis. A z-stack of image data is captured at a relative angular position and a number of relative z-positions.

If image data are captured in a first relative z-position, an image of the focal plane (field of view; FoV) is captured and imaged. If image data are captured in two different relative z-positions in the same relative angular position, a sample volume is imaged if the two focal planes do not completely overlap one another or adjoin one another in the z-direction (volume of view; VoV). If a stack (z-stack) of image data of adjoining or overlapping focal planes is captured in this way, it is possible to fully capture a (volumetric) section of the sample along the detection axis and under the relevant relative angular position.

In order to illuminate only one focal plane in each case and in order to reduce unwanted image information from outside of the focal plane, the illumination radiation is advantageously shaped into a light sheet and radiated into the sample space. Illuminating the sample using a light sheet is advantageous for large and scattering samples, in particular.

To produce the light sheet, the illumination radiation is advantageously used in the form of a non-diffractive beam. By way of example, such a non-diffractive beam can be a beam whose frequency spectrum has been limited by means of a sinc filter, as described in DE 10 2012 013 163 A1 (and also referred to as a sinc3 beam). To produce a light sheet, the sinc3 beam need not be scanned laterally. However, a lateral scanning is required in further utilizable non-diffractive beams, such as a Mathieu beam or a Bessel beam. Using a $sinc^3$ beam, in particular, it is possible to produce potential light sheets with a small thickness in the Z-direction. An advantage of a thin light sheet produced using a non-diffractive beam shape is a resulting virtually isotropic system PSF (point spread function). Such an isotropic system PSF exhibits a similar resolution in all three spatial directions, which in turn is advantageous for a possible coordinate transformation.

Further non-diffractive beams utilizable for producing the light sheet include, in particular, Airy beams, circular Airy beams, coherent Bessel beams [Gao, L. et al. (2012), Non-invasive Imaging beyond the Diffraction Limit of 3D Dynamics in Thickly Fluorescent Specimens; Cell 151: 1370-1385] and structured light sheets [lattice light sheet; Chen, Bi-Chang, et al. (2014), Lattice light-sheet microscopy: imaging molecules to embryos at high spatiotemporal resolution; Science 346: 1257998].

Producing a light sheet using a known beam shape, for example a scanned Gaussian beam or a Gaussian beam shaped by means of a cylindrical optical unit, is alternatively likewise possible. However, it is then not possible to use the advantages of non-diffractive beam shapes.

If the refractive indices of the media in the sample chamber and outside of the sample chamber differ from one another, the refraction of the light sheet at the wall of the spherical sample chamber can be accounted for, especially if image data are captured at different relative z-positions. In this context, it is initially irrelevant whether it is the sample chamber or the objective that is moved. In this case, the angle of incidence of the light sheet is altered as a function of the relative z-position (z-position). The angle between the illumination beam and a normal of the point of incidence of the illumination beam on the outer side is understood to be the angle of incidence.

The angle of incidence can be selected on the basis of the relationship $\alpha(z)=\arcsin((nb/na*R)z)$, where na is the refractive index of a medium outside of the sample chamber; nb is the refractive index of a medium within the sample chamber, R is the radius of the spherical segment of the outer side, and z is the respective z-position along the detection axis.

Using the above-described configuration of the method, it is possible to image a fraction of the volume of the sample. To capture a greater fraction of the volume of the sample or the sample as a whole, image data of adjacent or overlapping portions of the sample, which have different relative angular positions of the sample chamber and detection axis, are captured as a z-stack. To this end, the relative angular position is altered in controlled fashion in such a way that, for example once a z-stack has been captured in full, a further relative angular position is set and a further z-stack is captured. Parameters such as focal position, angle of incidence, and a light sheet position can be stored as lookup tables for different z-stacks.

On account of the pivot movement and/or the rotation, the captured regions of the sample necessarily overlap if the sample is captured to a great extent or in full (see also FIG. 5). This partial redundancy of the image data can be used to reduce imaging aberrations and to increase the quality of the image data. This can advantageously reduce aberrations and instances of scattering, which likewise increase with increasing sample depth, for example, by virtue of image data of overlapping portions of the sample being evaluated by means of a multi-view fusion algorithm and image aberrations being reduced.

The use of a light sheet can advantageously be combined with plenoptic detection or light field detection [e.g., Prevedel, R. et al. (2014): Simultaneous whole-animal 3D imaging of neuronal activity using light-field microscopy. Nature methods, 11: 727]. When plenoptic detection is used, it is possible to produce and radiate in a thicker and longer light sheet. The light field detection can be used to also reconstruct, in one exposure, a part of the sample in the z-direction along the thickness of the light sheet from the additionally available angle information. This can significantly reduce the overall recording time required since, in addition to a lateral parallelization (wide field), parallelization is also carried out along the detection axis (plenoptics). The light sheet illumination advantageously reduces the problem of out-of-focus background fluorescence, which makes plenoptic reconstruction more difficult.

As an alternative to illumination of the sample or the sample chamber with a light sheet, the illumination can be implemented by means of a point or multipoint scanner. The detection of the image data can be implemented in confocal fashion, in the wide field or by means of plenoptic detection (see below in this respect).

The sample chamber is designed for use in the field of microscopy. It surrounds a sample space for positioning a sample and includes at least one wall that delimits the sample space and has an outer side facing away from the sample space.

The sample chamber is characterized in that the outer side of the wall has the shape of a spherical segment with a circular disk as a base. Moreover, there is a sample holder for holding the sample in the plane of the circular disk.

In an advantageous embodiment of the sample chamber, the spherical segment covers an angular range of at least 90°, but preferably at least 120°. Sample chambers with a covered angular range of at least 150°, in particular 180°, are well suited to the microscopic examination of cleared samples. In further embodiments, the angular range covered by the spherical segment can also be more than 180°, for example 210°, 240°, or 270°.

The sample chamber advantageously allows positioning of a sample with an extent in each spatial direction of at least 3 mm, for example at least 5 or 10 mm.

Advantageously, the sample chamber can be tightly sealed using a further wall such that, for example, a sample medium is kept in the sample chamber and cannot unintentionally escape from the latter.

This further wall can be a separate wall and can serve as a sample holder at the same time. To this end, an inner side of the further wall extends in the plane of the circular area. In further embodiments, the sample holder in the form of a further wall can also be a sample carrier with at least one carrier surface. A carrier surface can include at least one holding area, in which a sample chamber can be arranged, for example, placed, plugged on, or fastened in any other way.

A holding area can have, for example, a structure such as an elevation and/or a ring-shaped depression. The sample chamber can be placed over the elevation and is held by the latter in the holding area. A depression can likewise represent a lateral guide for the sample chamber. Moreover, the depression can contain a seal or hold the latter such that the sample chamber is sealed in liquid-tight fashion. In further embodiments, a sealing effect can be achieved by virtue of the surfaces of the regions of the sample chamber placed in the depression and/or the surface of the depression having a very good fit to one another and, for example, being sealed by adhesion forces or capillary forces of the surfaces or of a liquid film situated therebetween.

To simplify automated handling of a relatively large number of samples in particular, a sample carrier can have at least two sample chambers arranged on the sample carrier. Such a sample carrier with sample chambers can be handled like a multiwell plate, as is known from laboratory operations.

In further embodiments of the sample carrier, the latter includes a plurality of carrier surfaces, which can be arranged with angular offset with respect to one another. Here, the offset can be in a plane or in space. By way of example, carrier surfaces can be arranged around an axis. The individual carrier surfaces can be moved into a capture position in a controlled fashion, while the respective other carrier surfaces are in a waiting position.

Individual sample chambers which, for example, can be sealed by a separate wall or else sample carriers can have channels for supplying and/or removing media to and from the sample space. By way of the channels, it is possible to supply and remove different media such as chemicals for clearing and/or rinsing the sample, and sample media. To allow this to occur in controlled fashion, the channels are advantageously flow-connected to pumps and media reservoirs. Moreover, sensors and a control unit are advantageously present.

By way of example, aberrations occur as a consequence of media with different refractive indices, through which the illumination radiation and/or the detection radiation passes. In a possible embodiment of the sample carrier, the latter includes at least one carrier surface. On the latter, a circumferential wall stands upright, surrounds a holding area as a lateral boundary, and forms a hollow cylinder that is open on one of its end faces together with the sample carrier. If the sample chamber is arranged in the holding area, the hollow cylinder can be filled with an immersion medium into which an objective can be immersed. In further embodiments, this additional chamber, also referred to as "dipping chamber" for simplicity, may also have a different cross section, for example a rectangular or polygonal cross section with, for example, 5, 8, 10 or 20 corners. In a further embodiment option, the sample chamber is arranged in a vessel, for example placed on the bottom of the latter.

Such an embodiment of a sample carrier that includes a sample chamber facilitates a complete separation of the optics, in particular the objective, from the aggressive media within the sample chamber, despite the use of an immersion medium. By means of the immersion medium present in the hollow cylinder, it is possible to realize higher numerical apertures than in the case of an air gap. It is advantageous if the immersion medium in the dipping chamber has the same refractive index as the sample medium. A further improvement in the imaging quality can be achieved if immersion the medium and the sample medium have the same Abbe number and even the same partial dispersion.

Exact matching of the refractive indices or of the Abbe number and the partial dispersion is difficult in practice. Thus, the refractive index, Abbe number and/or partial dispersion of newly developed or further developed media for clearing are often not known or only known approximately. The refractive index of the immersion medium can be adapted dynamically by mixing two or more suitable initial media. If work is carried out with a dynamically mixed immersion medium, it is advantageous if the refractive index of the wall material of the sample chamber is similar to the refractive index of the sample medium and/or immersion medium.

The methods described herein can be carried out by means of an apparatus for capturing image data, which includes a sample chamber or a combination of sample carrier and sample chamber. The apparatus can include a light source for providing illumination radiation along an illumination beam path. Moreover, a beam shaping optical unit can shape the illumination radiation to form a light sheet, with the beam shaping optical unit interacting with a first scanner arranged in, or in the vicinity of, a pupil of the illumination beam path and serving to deflect the illumination radiation.

In addition to using a sample chamber, the apparatus can include a second scanner that is movable about a pivot point is arranged in the vicinity of an intermediate image in the illumination beam path. The scanning optical unit can image the pivot point of the second scanner on an entry point of the light sheet on the outer side of the sample chamber.

The functions of the first scanner and of the second scanner can include updating the angle of incidence of the light sheet by way of the first scanner and spatially displacing the light sheet by means of the second scanner.

The angle can be updated by the first scanner, which can be a conventional galvanometric scanning mirror. Since the movement associated with updating the angle need not be fast within the meaning of a scanning movement of a laser scanning microscope (LSM), other actuators are also possible. By way of example, use can be made of piezo actuators, DC motors, or stepper motors with, e.g., a spindle drive.

During the actual operation of the apparatus, spatial displacement of the light sheet can be used, for example, to correct, e.g., focal deviations caused by aberrations. The second scanner can serve this end. In contrast to a typical scanner arrangement in an LSM, it is not the case that both scanners are located in a pupil of the illumination beam path.

If image data are captured at different relative z-positions, there is also a change in the optical path lengths in the sample medium. It may therefore be necessary to correct the focusing along the light sheet propagation direction. By way of example, such a correction can be implemented by displacing the illumination objective or a tube lens or by way of other focusing optical units. The first and the second scanner can move in a plane while the scanning planes are orthogonal to one another in a conventional scanner arrangement in an LSM.

Should a beam shape that requires lateral "smearing" by a scanning movement be chosen for producing the light sheet, this can be implemented by a third scanner which—in a manner comparable to the conventional LSM arrangement—is located close to the first scanner. By way of example, such beam shapes include the sinc3 beam or the radially symmetric Bessel beam. Therefore, the first and the third scanner are close to the pupil in such an arrangement. The third scanner brings about a fast movement of the light sheet orthogonal to the movement plane of the first scanner.

The penetration depths required, as a rule, for mapping, for example, neurons in a complete mouse brain several millimeters in size lead to aberrations, even in the case of the best possible clearing protocols and an additional adaptation of the refractive indices. Adaptive optical elements or units can advantageously be used for the correction thereof. Suitable adaptive optical units include, for example, deformable mirrors, spatial light modulators (SLMs), and the combinations thereof. The use of optical auxiliary structures, for example, a so-called guide star, is possible. The adaptive optical elements can be arranged in the illumination beam path and/or in the detection beam path.

The techniques described herein can be used for displaying large, cleared samples such as brains of mice. In addition to the use of imaging methods suitable for thick, dense, and scattering samples, i.e., in particular, multiphoton methods (point scanner, temporal focusing), advantageous use is made of objectives or imaging systems with rather moderate magnifications. These can be advantageously combined with cameras that have a very large number of pixels ("macroscope") in order to allow for mapping of, for example, the entire brain using as few individual recordings as possible.

In particular, advantages lie in a separation of sample medium and objective. If the sample carrier is provided with a microfluidic system, i.e., with channels, clearing protocols can be carried out in an automatic and reproducible fashion. There is no need to change the sample carrier or the sample chamber between clearing and imaging steps. The sample chamber can be integrated in a "lab on the chip" environment. In addition to automatically carrying out clearing protocols and capturing images, it is also possible to store the sample during a controlled media exchange in this case.

BRIEF DESCRIPTION OF THE DRAWINGS

The invention is explained in more detail below on the basis of exemplary embodiments and figures. In the drawings:

FIG. 1 shows a schematic illustration of an exemplary embodiment of a sample chamber as per the prior art;

FIG. 3 shows a schematic illustration of an exemplary embodiment of a sample chamber and of a sample carrier;

FIG. 4 shows a schematic illustration of a first configuration of the method, with FIG. 4a showing the capture of image data in a first relative angular position and in a first relative Z-position; FIG. 4b showing the capture of image data in a second relative angular position and in a second relative Z-position; and FIG. 4c showing the capture of image data in the second relative angular position and in a third relative Z-position;

FIG. 10 shows a schematic illustration of a first exemplary embodiment of a sample carrier with a number of sample chambers, and FIG. 11 shows a schematic illustration of a second exemplary embodiment of a sample carrier with a number of sample chambers and channels for supplying and/or removing media.

Figure 2B:
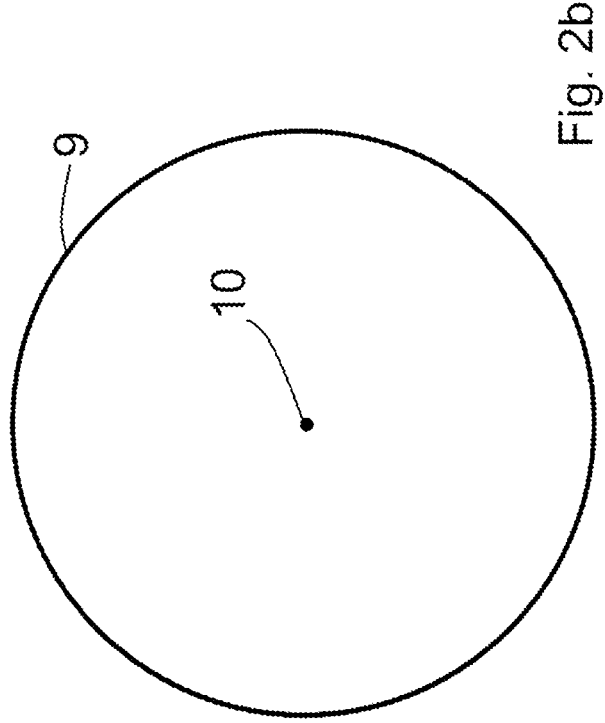
FIG. 2 shows a schematic illustration of a first exemplary embodiment of a sample chamber, in a sectional illustration (FIG. 2a) and in a plan view from below (FIG. 2b)

The exemplary embodiments are illustrated schematically. Identical technical elements are labeled by the same reference signs.

DETAILED DESCRIPTION

FIG. 1 illustrates a sample chamber 1 known from the prior art, which surrounds a sample space 2 in which a sample 3 can be positioned. The sample space 2 is filled with a sample medium 4, into which an objective 5 of an imaging optical unit of an optical apparatus (not illustrated in more detail) can be immersed. The sample medium 4, which acts as immersion medium 14 at the same time, has a first refractive index n1 and is in direct contact with the objective 5. If the sample medium 4 is a chemical or a mixture of chemical components, as are used to clear the sample 3, there is a risk of the objective 5 being damaged on account of the often aggressive properties thereof. The sample space 2 is surrounded on three sides by a wall 6, formed substantially from planar partial areas in the prior art, wherein the partial areas need not be optically effective, for example, need not be transparent. The sample 3 can be illuminated with illumination radiation along an illumination beam path 7, which coincides with an optical axis OA of the objective 5. Detection radiation effected in the sample 3 is captured by the objective 5 along a detection axis DA of a detection beam path 8, with the optical axis OA and the detection axis DA coinciding.

Figure 2A:
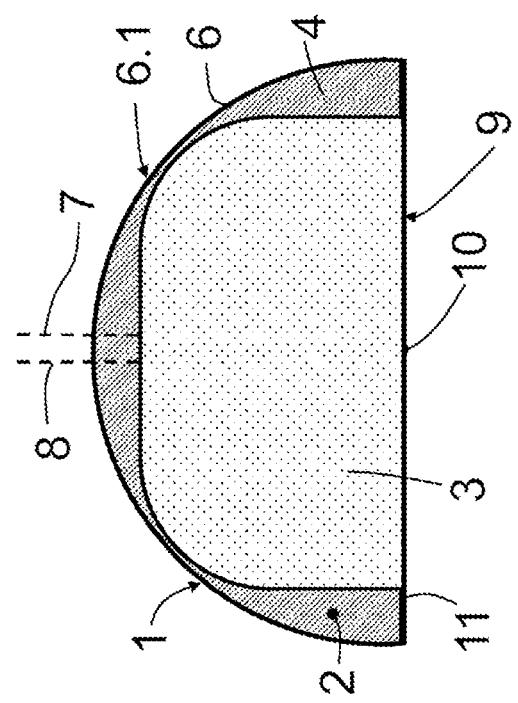

A first exemplary embodiment of a sample chamber 1 is shown in FIG. 2a in a lateral sectional illustration. The sample space 2 is delimited by a wall 6, wherein an outer side 6.1 of the wall 6 has the shape of a spherical segment (FIG. 2a). The spherical segment covers a circular area 9 with a center 10 (see also FIG. 2b). The sample space 2 is delimited by a further wall 11, which extends in the plane of the circular area 9. If used as intended, the sample chamber 1 is provided to allow the illumination beam path 7 to pass through the outer side 6.1 and into the sample space 2, and to allow the detection beam path 8 likewise to pass through the outer side 6.1. Illumination beam path 7 and detection beam path 8 may coincide or, as indicated in FIG. 2a, be separated from one another.

The spherical sample chamber 1 surrounds the sample 3, for example, a brain to be imaged, as tightly as possible. The sample medium 4 used for clearing is situated in the sample chamber 1. Detection radiation can be captured by means of an objective 5 embodied as an air objective (see FIGS. 4a to 4c, for example).

In a further exemplary embodiment, the sample chamber 1 is placed on a carrier surface 12 of a sample carrier 13 and surrounded by a wall 15 in the form of a hollow cylinder standing upright on the carrier surface 12 (FIG. 3). Together, sample carrier 13 and carrier surface 12 can also form an open vessel in further embodiments. In further embodiments, the wall 15 or cylinder wall can have a different shape in a plan view, for example, a polygonal or oval shape. A space 16 present above the sample chamber 1 is filled with air or with an immersion medium 14, into which the objective 5 is immersed or can be immersed.

The immersion medium 14 has a second refractive index n2 and serves to increase the numerical aperture (NA) of the objective 5. A nonaggressive chemical compound or such a substance mixture, which is usually also cost-effective, can be selected as immersion medium 14.

The first and second refractive indices n1, n2 and possibly also the Abbe number v1 and v2, respectively, thereof can be chosen to be close to one another or identical to one another. Then, the thickness of the wall 6 can be as low as possible and/or the wall 6 can include a material whose refractive index is close to the refractive index n1 or n2.

The immersion medium 14 can also be mixed from two or more suitable components, and hence the refractive indices n1 and n2 can be matched to one another to the best possible extent. Such an adjustment of the composition of the immersion medium 14 can also be implemented dynamically in further embodiments by virtue of components of the immersion mixture 14 or an already mixed immersion medium 14 being supplied to the space 16 in controlled fashion by way of supply and removal lines (not shown). In this way, such a "dipping chamber" can be flexibly adapted to different operating conditions.

FIGS. 4a to 4c schematically show the course of one example process. In FIG. 4a, a sample chamber 1 is brought into a first relative angular position. This means that it is inclined at a certain angle in relation to a reference coordinate system, for example, the illustrated Cartesian coordinate system with mutually orthogonal axes x, y, and z. In the example shown, the circular area 9 extends parallel to a plane spanned by axes x and y. Along an illumination beam path 7 and an illumination axis BA, illumination radiation is radiated through the outer side 6.1 and into the sample space 2 at an angle of incidence α. On account of the differences in the refractive indices of surroundings and sample medium 4, the illumination radiation is refracted upon passage through the wall 6 and subsequently extends approximately horizontally through the sample space 2 and the sample 3. The positioning of the refracted section of the illumination beam path 7 along the Z-axis z specifies a first relative z-position. The objective 5 is focused on the refracted section of the illumination beam path 7, which can be embodied as a light sheet 17 in particular.

An optical axis OA of the objective 5 used to capture detection radiation is directed perpendicular to the refracted section of the illumination beam path 7 and through the center 10. Image data of a part of the illuminated regions, in particular, of an illuminated plane, of the sample 3 can now be captured by means of the objective 5. To capture a volume of the sample 3 along the optical axis OA, a so-called z-stack 18 (see FIG. 5) of object planes is captured in different relative z-positions (symbolized by the vertical double-headed arrow) and subsequently put together (see also FIG. 5). Corrections of the angle of incidence α of the illumination beam path 7 possibly required in the process are explained in relation to FIG. 9.

Using this procedure, it is not possible to fully image the volume of a relatively large sample 3 since it is only possible to capture a restricted lateral extent (=field of view) and vertical extent (=depth of field) of the focal plane—in fact of a focal volume—as are schematically elucidated by the rectangle in FIGS. 4b and 4c. However, if the sample chamber 1 were moved laterally relative to the objective 5 for complete image capture of the sample 3, significant aberrations would occur on account of the arching of the sample chamber 1. Therefore, the sample chamber 1 can be pivoted and/or rotated about the center 10, as shown in FIGS. 4b and 4c. Thus, as shown in FIG. 4b, the sample chamber 1 has been brought into a further relative angular position and into a further relative z-position. At this relative angular position, a z-stack 18 can again be captured (FIG. 4c), stored, and finally put together to form a representation of the sample 3. For complete capture of the sample 3, it is possible to set, in freely selectable fashion, corresponding relative angular positions and capture z-stacks 18.

Figure 5C:
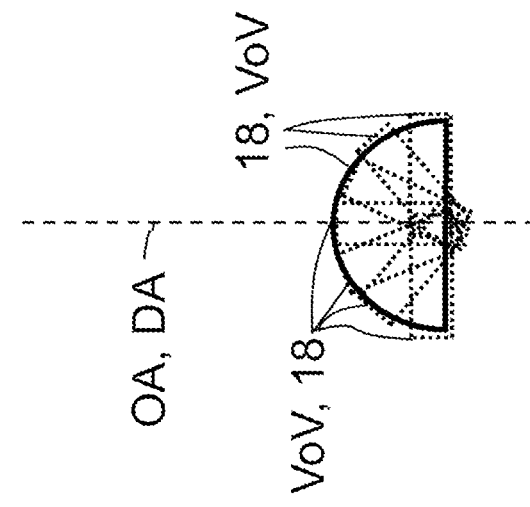
FIGS. 5a to 5c show a schematic illustration of a sequential capture of z-stacks at different relative angular positions and a resultant coverage of the sample with a number of z-stacks.
Figure 5B:
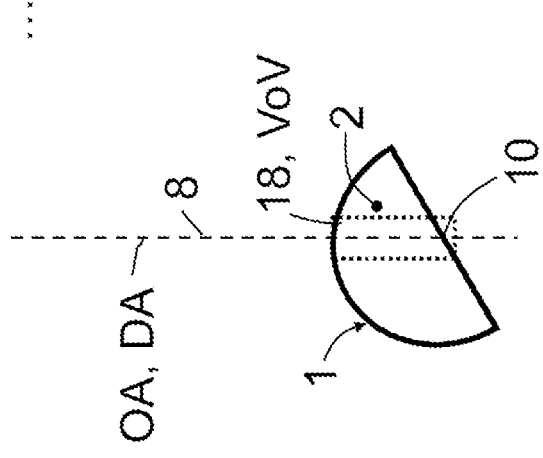
Figure 5A:
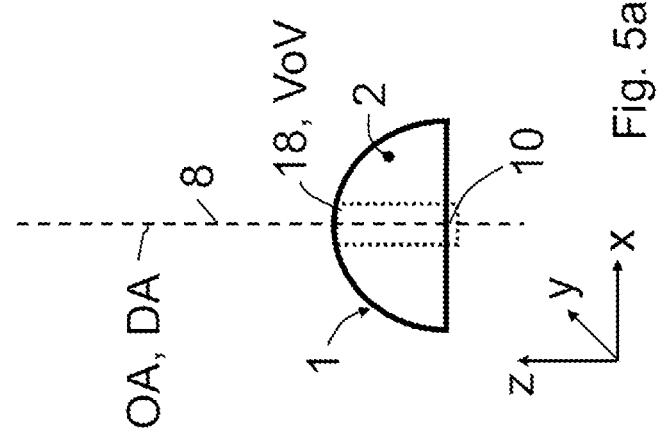

This procedure is shown in simplified fashion in partial figures, FIGS. 5a to 5c. In a first relative angular position of the sample chamber 1, a first z-stack 18 is captured along a detection beam path 8 in the direction of the Z-axis z and is stored together with data relating to the respective relative angular position and relative z-position (FIG. 5a). Subsequently, the sample chamber 1 is pivoted and/or rotated through a certain angle about the center 10. A z-stack 18 of image data of the sample 3 that has been brought into a second or further relative angular position in this way is captured (FIG. 5b). After a number N of such captures of z-stacks 18, the entire volume of the sample space 2 and of the sample 3 (not illustrated) is captured and the stored individual z-stacks 18 can be put together for a representation of the overall volume of the sample 3, as is symbolized schematically in FIG. 5c.

Figure 8:
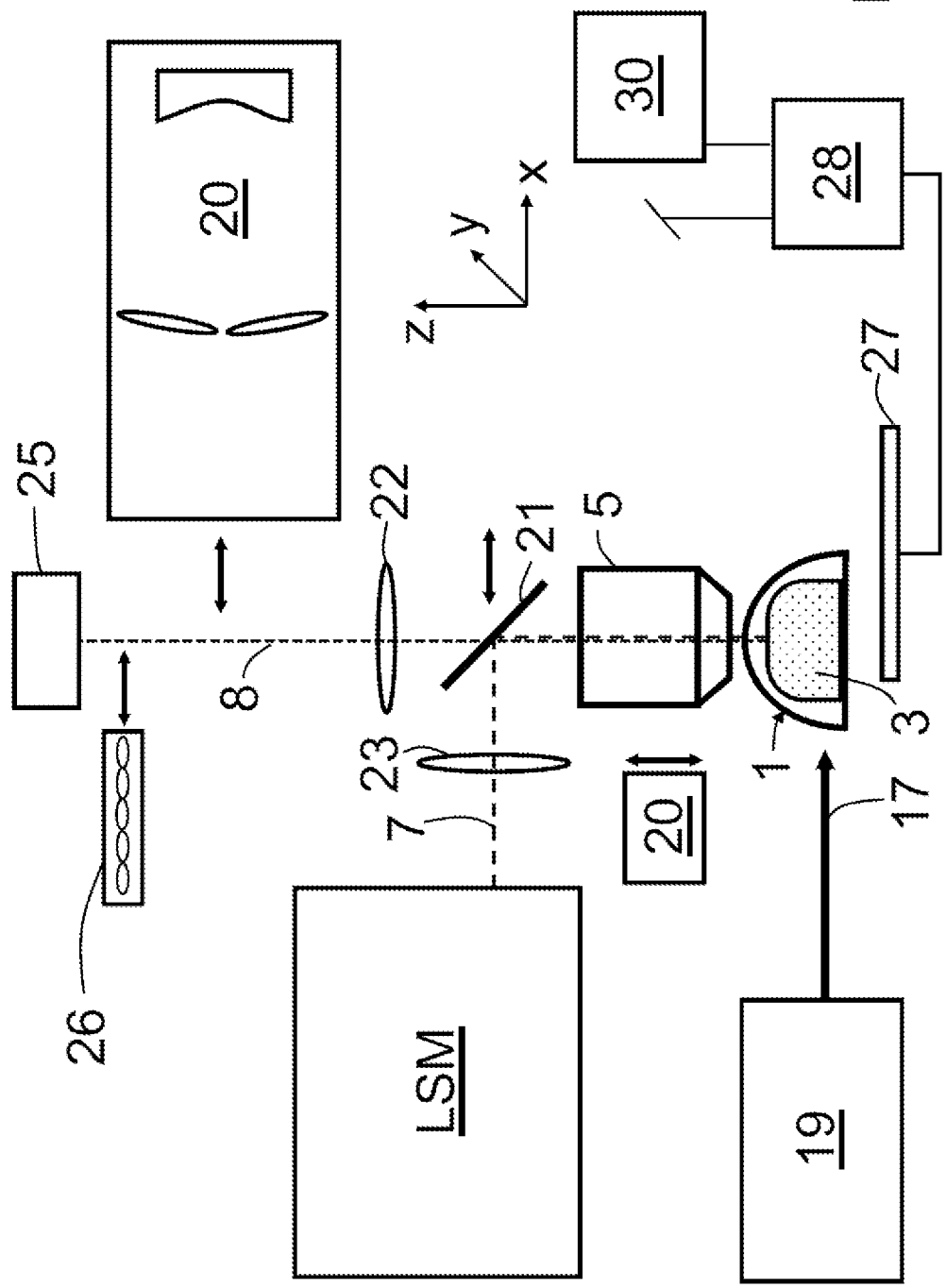
FIG. 8 shows a schematic illustration of an exemplary embodiment of an imaging system having the option of choosing different imaging methods depending on the sample.

Occurring overlaps between the individual z-stacks 18 can be used to improve the data quality by virtue of, for example, an evaluation being carried out by means of a multi-view fusion algorithm. Remaining aberrations can be corrected by means of adaptive optical elements (see, e.g., FIG. 8).

Figure 7:
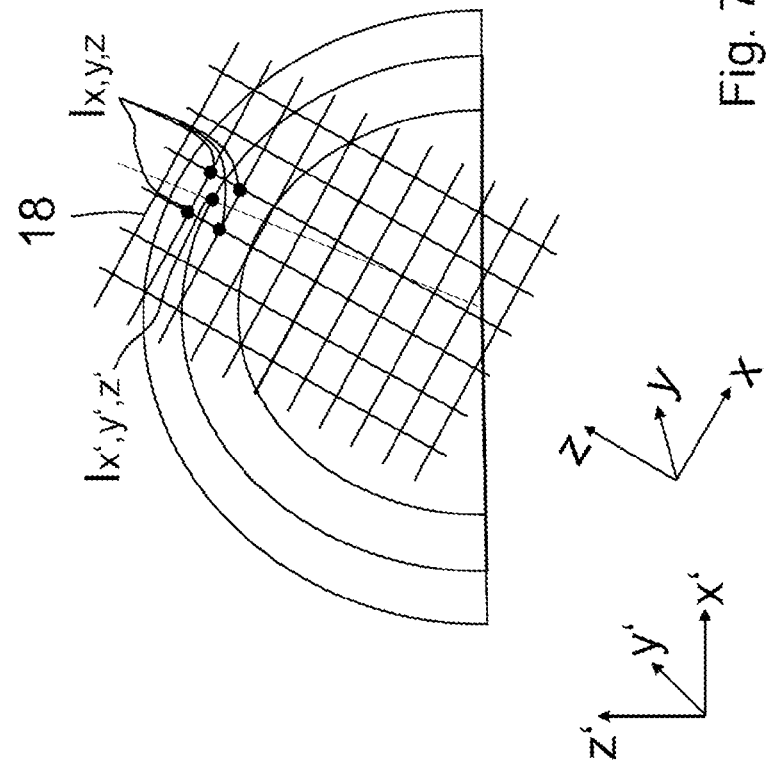
FIG. 7 shows a schematic illustration of a coordinate transformation of a z-stack into a spherical coordinate system.
Figure 6:
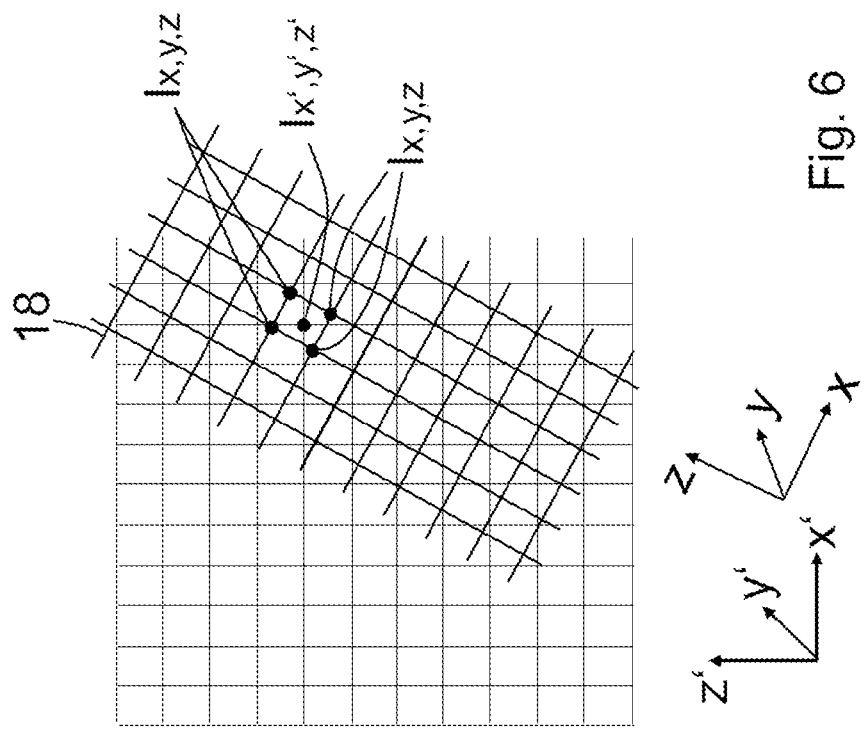
FIG. 6 shows a schematic illustration of a coordinate transformation of a z-stack into a horizontally aligned coordinate system.

The image data obtained by the techniques described herein can be represented in different coordinates. Purely in representative fashion, FIGS. 6 and 7 show a transformation of a tilted z-stack 18 into a horizontal alignment (FIG. 6) and a transformation of a tilted z-stack into spherical coordinates (FIG. 7), respectively. By way of example, a weighted interpolation can be used to transform the coordinates. By way of example, captured intensity values $I_{x,y,z}$ of four points of a z-stack 18 are shown, which are interpolated to a transformed intensity value $I_{x',y',z'}$ of a point (coordinate)

of the horizontal coordinate system (FIG. 6) or of the spherical coordinate system (FIG. 7).

A schematic representation of an exemplary embodiment of an imaging system that has the option of choosing different imaging methods depending on the sample 3 (FIG. 8) includes a beam shaping unit 19 for providing and shaping illumination radiation to form a light sheet 17 and/or a laser scanning microscope LSM (also abbreviated LSM below).

Optionally, an adaptive optical unit 20 can be present in the illumination beam path 7 of the beam shaping unit 19 and/or of the LSM. By way of example, at least one optical lens 23 and a beam splitter 21 are arranged in the illumination beam path 7 of the LSM. As a result of the effect of the beam splitter 21, the illumination radiation is steered to the objective 5 and radiated into the sample space 2 of the sample chamber 1. Detection radiation generated in the sample 3 passes through the objective 5 and the beam splitter 21, which is transmissive to the detection radiation, along the detection beam path 8 to a tube lens 22 and, from there, to a detector 25, for example a camera. Optionally, the beam splitter 21 can be inserted or pivoted into the illumination beam path 7 and/or the detection beam path 8.

The sample 3 can be selectively illuminated by a light sheet 17, by means of a point scanner of an LSM or by means of a multipoint scanner of an LSM. The LSM or the beam shaping unit 19 serve as a light source.

The detection radiation can be captured in confocal fashion, in the wide field or in plenoptic fashion. The latter variant can be implemented using a microlens array 26. To correct aberrations that may occur, an appropriately controllable adaptive optical unit 20 can be arranged in the detection beam path 8. The microlens array 26 can optionally be inserted or pivoted into the detection beam path 8 using appropriate actuators (not shown).

The sample chamber 1 can be pivoted about each of the axes X, Y and Z and can be displaced along these axes by means of a controlledly drivable sample stage 27. A rotation about the axis Z is possible. The sample chamber 1 can be pivoted about the center 10 (see FIGS. 4a to 5c) and optionally rotated about an axis that extends through the center 10 and extends in the direction of the Z-axis Z (see, e.g., FIGS. 4a to 5). In addition to, or as an alternative to, a feed movement along the Z-axis z, the objective 5 is embodied to be positioned in the direction of the Z-axis z by means of a controllable drive 30.

Optionally, it may be possible for the sample chamber 1 to be able to be displaced in a controlled fashion along the x and y axes and, in particular, in the direction of the Z-axis z by means of the sample stage 27, for example, in order to position the sample chamber 1 relative to the illumination beam path 7. The movement option along the Z-axis z represents an option for capturing the z-stacks 18.

In further possible embodiments, the relative angular positions and/or the relative z-positions can be set by way of an appropriate movement of the objective 5. It is also possible, for example, for the settings of the relative angular positions and/or the relative z-positions to be set by combinations of the movements of objective 5 and sample stage 27.

To control the sample stage 27 and the various actuators or at least one drive 30 there is a control unit 28, for example, a computer or an appropriately configured part of a computer, and said control unit can be connected to the sample stage 27, the drives 30 (only one illustrated in exemplary fashion), and optionally the camera 25 (only shown in indicated fashion) in a manner that is suitable for transferring data and control commands.

If the illumination/detection is implemented through the objective 5, the z-stacks 18 (see, e.g., FIGS. 5a to 5c) can be recorded by moving the sample 3 and/or by moving the objective 5 and altering the respective focal plane as relative z-position. The above-described rotation of the sample chamber 1 has no optical effect in this case if the point of rotation and the center 10 coincide (see, e.g., FIG. 5).

Particularly when illuminating the sample 3 with a light sheet 17, it may be necessary to adapt the angle of incidence αn on the basis of a respectively current relative Z-position within the sense of angle tracking. Additionally, a spatial displacement may be necessary in order to correct focal displacements caused by aberrations, which occur in practice. On part of the apparatus, angle tracking and spatial displacement are possible using an apparatus as shown in FIG. 9.

Figure 9:
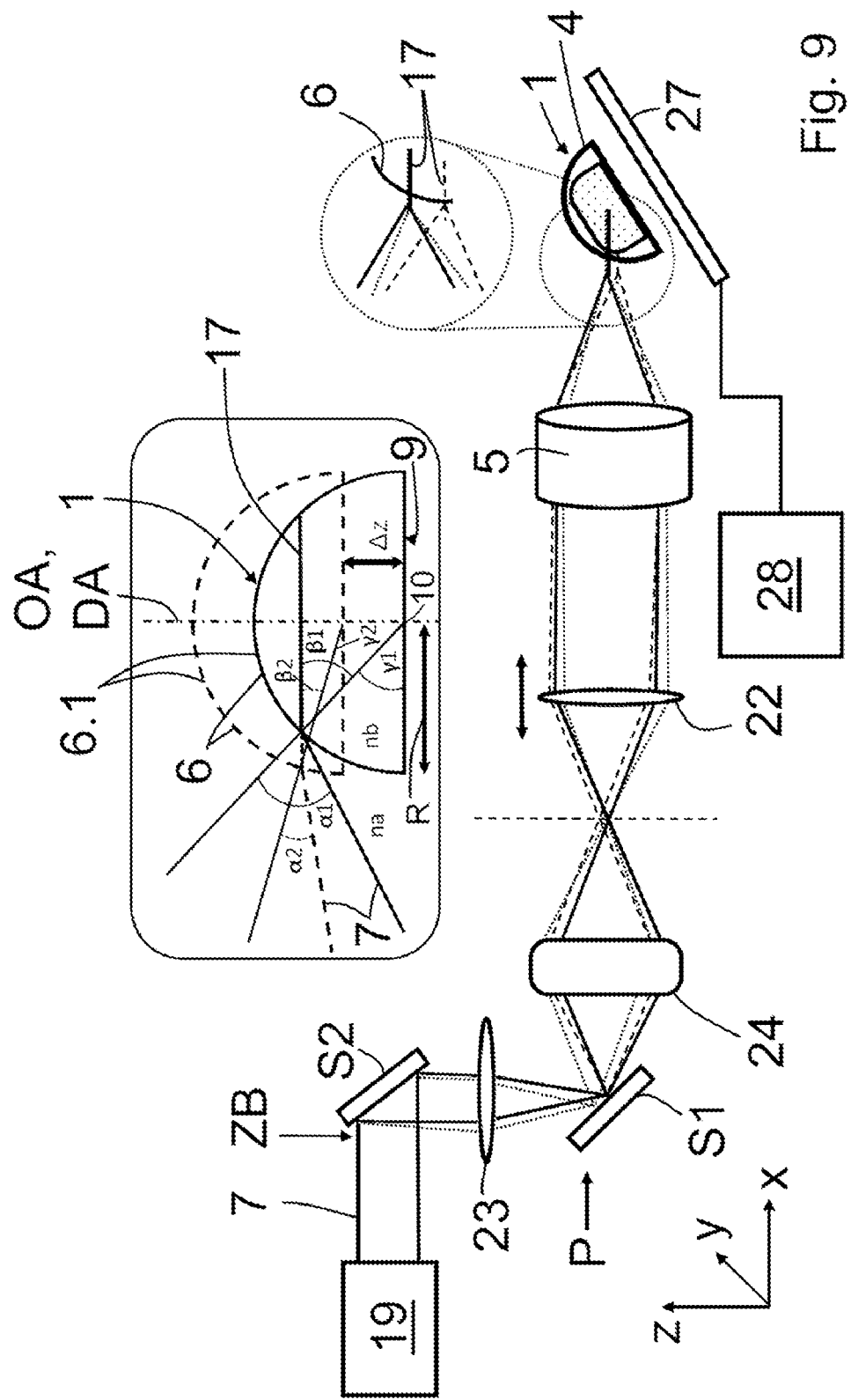
FIG. 9 shows a schematic illustration of an exemplary embodiment of an optical arrangement for updating location and angle in the case of light sheet illumination on a sample chamber and a schematic illustration of the angle update (inserted figure)

The inserted figure in FIG. 9 schematically shows various angles of a sample chamber 1, of an illumination beam path 7, and of a light sheet 17. Here, the sample chamber 1 and the illumination beam path 7 are illustrated in a first relative Z-position using continuous solid lines and in a second relative Z-position using broken solid lines. Outside of the sample chamber 1, the illumination radiation passes through a medium with the first refractive index na. The sample chamber 1 with the sample medium 4 includes a second refractive index nb, with nb>na. The respective angle of incidence αn is measured between the respective illumination beam path 7 and a normal on the outer side 6.1. Since the wall 6, in particular, the outer side 6.1 thereof, is formed as a spherical segment with a radius R, an extension of the normal extends through the center 10 and includes an angle γn with a further wall 11 that acts as a base of the sample chamber 1 or with the plane of the circular area 9.

In the first relative Z-position, the illumination radiation along the illumination beam path 7 is directed at the outer side 6.1 of the spherically shaped wall 6 of the sample chamber 1 at a first angle of incidence α1. The extension of the normal passes through the center 10 at an angle γ1. The illumination beam path 7 is refracted in accordance with the differences in the refractive indices na and nb. Here, the angle of incidence α1 is chosen in such a way that the refracted section of the illumination beam path 7 extends parallel to the plane of the circular area 9 and image data can be captured along the detection axis DA, for example, by means of an objective 5. The refracted section of the illumination beam path 7 includes an angle β1 with the extension of the normal.

If the sample chamber 1 is displaced along a distance Δz in the direction of the Z-axis z into the second relative Z-position, image data can be captured with an unchanged focal position of the objective 5 if an angle of incidence α2 is set. In the process, the extension of the normal now passes through the center 10 at an angle γ2. The refracted section of the illumination beam path 7 includes an angle β2 with the extension of the normal, where β1>β2.

Without such a correction of the angle of incidence αn, the refracted section of the illumination beam path 7 would no longer extend parallel to the plane of the circular area 9 in the second relative Z-position.

The optical arrangement for tracking location and angle in the case of light sheet illumination for a sample chamber in accordance with the illustrated exemplary embodiment can include the beam shaping unit 19, in which illumination radiation provided by a light source (not illustrated in more detail) is shaped to form a light sheet 17. At least one optical lens 23, a first scanner S1, a scanning optical unit 24, a tube lens 22 and an objective 5, which acts as illumination objective, follow in the illumination beam path 7.

The first scanner S1 is located in, or in the vicinity of, a pupil P of the illumination beam path 7 and serves for displacing the location. By way of example, the first scanner S1 can include a galvanometric scanning mirror. An angle in the pupil P corresponds to a location in the sample 3, which is why an angle change of the first scanner S1 leads to displacement of the light sheet 17 in the direction of the z-axis z.

For the purposes of updating the angle, a second scanner S2 is arranged between the beam shaping unit 19 and the first scanner S1. It is located in the vicinity of an intermediate image ZB. The two scanners S1 and S2 deflect the illumination beam path 7 in the same movement planes. This distinguishes them from a scanner arrangement of a typical LSM, in which the movement planes are orthogonal to one another. To displace the location of the point of incidence of the illumination beam path 7 to the outer side 6.1 of the sample chamber 1, the pivot point of the second scanner S2 is imaged onto the outer side 6.1 by means of the scanning optical unit 24. The second scanner S2 alters an angle in the intermediate image ZB, which corresponds to a change in location in the pupil P and on the first scanner S1 and to an angle in the sample 3. Since the angle should be set just in front of the sample 3, an angle deviation can be corrected accordingly by means of an axial displacement of the optical lens 23.

A correction of the focusing along the propagation direction of the light sheet 17 can be implemented, for example, by displacing the objective 5, the tube lens 22, or by other focus optical units. A correction of the focusing may be required since the optical path length in the sample medium 4 is different at different relative Z-positions and therefore changes when capturing a z-stack 18.

In a further embodiment of the optical arrangement, a third scanner S3 (not shown) can be arranged near the pupil and, for example, close to the first scanner S1. The effect of the third scanner S3 brings about a fast movement of the light sheet 17 perpendicular to the plane of the drawing. Such an arrangement can be used if a beam shape requiring lateral "smearing" (e.g., a Bessel beam) is chosen for producing the light sheet 17.

By way of example, to simplify an automated capture of image data, a plurality of sample chambers 1 may have been arranged or can be arranged on a sample carrier 13. The sample carrier 13 having a plurality of holding areas for sample chambers 1 can have a planar embodiment (FIG. 10). A sample chamber 1 to be observed in each case is fed to the objective 5 by an appropriate control of the sample stage 27 and/or the objective 5 is fed to the respective sample chamber 1. A first z-stack 18 can be captured in a first relative angular position. To capture further z-stacks 18, the objective 5 can be pivoted and/or the sample carrier 13 can be pivoted about the center 10 of the sample chamber 1 to be captured at this time.

In a further embodiment of a sample carrier 13 for a number of sample chambers 1, the former has carrier surfaces 12 which have an angular offset with respect to one another and on which a sample chamber 1 is arranged or can be arranged in each case. By way of example, the carrier surfaces 12 can be circumferential faces of a carousel or a turret. Such an embodiment increases the accessible angular range, within which relative angular positions can be set, in relation to an embodiment as per FIG. 10.

A sample carrier 13 according to any one of the preceding exemplary embodiments can include at least one channel 29, which opens into one of the holding areas (FIG. 11). The channel 29 serves to supply and/or remove sample medium 4 to and from the sample space 2.

In further embodiments there can be at least one channel 29 as a media supply line and at least one channel 29 as a media removal line in each holding area or in each sample chamber 1. To allow a supply or removal of media, the sample chamber 1 is delimited in the plane of the circular area 9 by the carrier surface 12 or openings (indicated) corresponding to some or all channels are correspondingly present in a further wall 11. In further embodiments, these openings can be provided with a valve or a seal in order to allow the sample chamber 1 to be removed from the carrier surface 12.

It is also possible for the sample chamber 1 to include the wall 6 and a closure in the plane of the circular area 9 to be formed by a surface of the carrier surface 12 as a further wall 11. The sample space 2 can be supplied with a sample medium 4 via the channel 29 or via the channels 29. In this case, the sample medium 4 might be, for example, a compound for clearing the sample 3, a nutrient solution, a buffer, or a compound for assisting the storage of the sample 3.

The exemplary embodiment illustrated in FIG. 11 shows carrier surfaces 12 which have an angular offset with respect to one another and on each of which a sample chamber 1 is placed onto a holding area. In each case, a carrier surface 12 with the sample chamber 1 present thereon can be brought into a capture position, the mid-position in the example shown, in which the carrier surface 12 located in the capture position is aligned orthogonal to the optical axis OA of the objective 5. In order to capture a number of z-stacks 18, as already described above, the objective 5 can be pivoted relative to the sample chamber 1 and different focal planes can be captured such that sample chamber 1 and objective 5 can be brought into different relative angular positions and/or relative z-positions relative to one another.

The angled arrangement of the carrier surfaces 12 which have an angular offset with respect to one another facilitates a better accessibility of the respective sample chamber 1 to be captured since the respectively adjacently arranged sample chambers 1 are pivoted out of the plane of the sample chamber 1 to be captured. The control of the current alignment of the sample carrier 13 and of the supply and/or removal of media via the channels 29 is implemented by means of the control unit 28 and by means of drives 30 and/or pumps 30.

The invention claimed is:

1. A method for operating a sample chamber for microscopic imaging, the method comprising:
providing the sample chamber in an illumination beam path, wherein the sample chamber surrounds a sample space for positioning a sample and includes a wall that delimits the sample space and has an outer side facing away from the sample space, the outer side having a shape of a spherical segment with a circular disk as a base, and wherein the illumination beam path is directed through the outer side and into the sample space along an illumination axis;
capturing detection radiation, which was caused by illumination radiation directed into the sample space along the illumination axis, along a detection axis that extends from the sample space through the wall of the sample chamber;
rotating and/or pivoting the sample chamber relative to the detection axis about a center of the circular disk, so that different relative angular positions of the sample chamber and the detection axis are set; and capturing image data at the different relative angular positions of the sample chamber and the detection axis.

2. The method of claim 1, further comprising:

displacing the sample chamber and/or a focal plane of an imaging optical unit relative to one another along the detection axis to set at least two respective relative z-positions; and capturing image data in at least two of the respective relative z-positions in one of the set relative angular positions.

3. The method of claim 1, further comprising:

shaping the illumination radiation into a light sheet; and radiating the light sheet into the sample space.

4. The method of claim 3, further comprising producing the light sheet from a non-diffractive beam of the illumination radiation.

5. The method of claim 3, further comprising:

displacing the sample chamber and/or a focal plane of an imaging optical unit relative to one another along the detection axis to set at least two respective relative z-positions;

capturing image data in at least two of the respective relative z-positions in one of the set relative angular positions; and selecting an angle of incidence (α) of the light sheet radiated into the sample space based on the respective relative z-position.

6. The method of claim 5, wherein the angle of incidence (α) is selected on the basis of a relationship $\alpha(z) = \arcsin((n_b/n_a * R)z)$, where $n_a$ is a refractive index of a medium outside of the sample chamber, $n_b$ is a refractive index of a medium within the sample chamber, R is the radius of the spherical segment of the outer side, and z is a respective position along the detection axis.

7. The method of claim 3, further comprising capturing the image data by plenoptic detection.

8. The method of claim 1, further comprising capturing image data of adjoining or overlapping portions of the sample with at different relative angular positions of the sample chamber and the detection axis.

9. The method of claim 8, further comprising evaluating the image data of the overlapping portions of the sample by means of a multi-view fusion algorithm.

* * * * *

UNITED STATES PATENT AND TRADEMARK OFFICE
CERTIFICATE OF CORRECTION

PATENT NO. : 12,259,538 B2
APPLICATION NO. : 17/309793
DATED : March 25, 2025
INVENTOR(S) : Kalkbrenner et al.

Page 1 of 1

It is certified that error appears in the above-identified patent and that said Letters Patent is hereby corrected as shown below:

In the Claims

In Column 16, Claim 5, Line 4, delete "(a)" and insert -- ($\alpha$) --, therefor.

In Column 16, Claim 8, Line 18, after "sample" delete "with".

Signed and Sealed this
Twenty-seventh Day of May, 2025

Coke Morgan Stewart
*Acting Director of the United States Patent and Trademark Office*